US011153326B2

(12) United States Patent
Keane

(10) Patent No.: US 11,153,326 B2
(45) Date of Patent: Oct. 19, 2021

(54) SECURE DISTRIBUTION AND SHARING OF MEETING CONTENT

(71) Applicant: FMR LLC, Boston, MA (US)

(72) Inventor: Declan Keane, Kildare (IE)

(73) Assignee: FMR LLC, Boston, MA (US)

( * ) Notice: Subject to any disclaimer, the term of this patent is extended or adjusted under 35 U.S.C. 154(b) by 470 days.

(21) Appl. No.: 15/893,851

(22) Filed: Feb. 12, 2018

(65) Prior Publication Data
US 2019/0253269 A1 Aug. 15, 2019

(51) Int. Cl.
H04L 29/06 (2006.01)
H04L 12/18 (2006.01)
H04M 1/72454 (2021.01)

(52) U.S. Cl.
CPC ........ *H04L 63/105* (2013.01); *H04L 12/1822* (2013.01); *H04L 12/1831* (2013.01); *H04L 63/0254* (2013.01); *H04L 63/0263* (2013.01); *H04L 63/20* (2013.01); *H04M 1/72454* (2021.01)

(58) Field of Classification Search
CPC ............. H04L 12/1822; H04L 12/1831; H04L 63/0254; H04L 63/105
USPC ........................................................ 713/152
See application file for complete search history.

(56) References Cited

U.S. PATENT DOCUMENTS

| 9,286,599 | B2* | 3/2016 | Crosbie ................ G06Q 10/101 |
| 2007/0071206 | A1 | 3/2007 | Gainsboro et al. |
| 2008/0189295 | A1 | 8/2008 | Khedouri et al. |
| 2009/0013052 | A1 | 1/2009 | Robarts et al. |
| 2009/0234721 | A1* | 9/2009 | Bigelow ................ G06Q 10/10 705/12 |
| 2012/0023168 | A1 | 1/2012 | Koren |
| 2014/0258469 | A1 | 9/2014 | Maharajh et al. |
| 2015/0095999 | A1* | 4/2015 | Toth .................... H04L 63/0823 726/6 |
| 2015/0199405 | A1 | 7/2015 | Redlich et al. |
| 2015/0200967 | A1 | 7/2015 | Redlich et al. |
| 2017/0339216 | A1* | 11/2017 | Carlos .................... H04L 67/06 |

* cited by examiner

Primary Examiner — Bradley W Holder
(74) Attorney, Agent, or Firm — Proskauer Rose LLP

(57) ABSTRACT

A computer-implemented method is provided for electronically distributing content in a meeting to a participant of an enterprise. The method includes receiving information related to the meeting, including one or more risk definitions corresponding to one or more sections of the content of the meeting and determining a risk level for the participant. The method also includes comparing the one or more risk definitions of the meeting content with the risk level of the participant and filtering the meeting for the participant based on the comparing. The method further includes causing to present the filtered content personalized to the participant.

18 Claims, 4 Drawing Sheets

SECURE DISTRIBUTION AND SHARING OF MEETING CONTENT

TECHNICAL FIELD

This application relates generally to systems, methods and apparatuses, including computer program products, for electronically distributing and sharing personalized content in a meeting to a remote participant.

BACKGROUND

Conducting online meetings often involve the distribution of meeting materials to various non-office locations and/or to people located in non-secure (e.g., observable) locations in an office, sometimes over unsecured devices. An example of an unsecured device is a terminal in a public access internet area (e.g. web café). In this case, the software installed on the unsecured device may not be known. Thus, recording software may be installed on the device and operable during an online meeting to steal sensitive meeting content. Thus, the non-secure locations and unsecured devices can pose a security risk, as sensitive data may be viewed by people without permission. In addition, once a user logs into a shared meeting, there is currently no way to determine if other parties are viewing the material, with or without the knowledge and consent of the organizer. Furthermore, current content sharing technologies use an 'all-or-nothing' approach, meaning that participants of a meeting can see all or none of the content being shared, with no granularity or content filtering capability (e.g., based on who or where the participant is).

SUMMARY

Accordingly, there is a need for systems, methods and apparatuses that enable sensitive meeting content to be shared across multiple locations and/or transmitted to multiple computing devices while imposing security control on the distributed meeting content. In some examples, the meeting content distributed to remote participants can be dynamically filtered and exposed to varying degrees of detail depending on multi-factor risk assessments of the participants.

In one aspect, a computer-implemented method is provided for electronically distributing content in a meeting to a participant of an enterprise. The method includes receiving, by a computing device, information related to the meeting, including one or more risk definitions corresponding to one or more sections of the content of the meeting and determining, by the computing device, a risk level for the participant. The risk level of the participant comprises (i) a personal risk factor of the participant based on a position of the participant in the enterprise, (ii) a static environmental measure indicating a level of security associated with a static environmental factor that remains unchanged throughout the meeting, and (iii) a dynamic environmental measure indicating a level of security associated with a dynamic environmental factor that is adapted to change during the meeting. The method also includes comparing, by the computing device, the one or more risk definitions of the meeting content with the risk level of the participant and filtering, by the computing device, the meeting for the participant based on the comparing. The method further includes causing to present, by the computing device, the filtered content personalized to the participant.

In another aspect, a computer-implemented system is provided for electronically distributing content in a meeting to a participant of an enterprise. The system comprises a risk assessment agent configured to receive information related to the meeting, including one or more risk definitions corresponding to one or more sections of the content and determine a risk level for the participant. The risk level of the participant comprises (i) a personal risk factor of the participant based on a position of the participant in the enterprise, (ii) a static environmental measure indicating a level of security associated with at least one static environmental factor that remains unchanged throughout the meeting, and (iii) a dynamic environmental measure indicating a level of security associated with at least one dynamic environmental factor that is adapted to change during the meeting. The risk assessment agent is also configured to compare the risk level of the participant to the one or more risk definitions corresponding to the one or more sections of the content of the meeting, filter the content of the meeting for the participant based on the comparing, and cause to present the filtered content personalized to the participant.

Any of the above aspects can include one or more of the following features. In some embodiments, the risk level of the participant is a weighted sum of the personal risk factor, the static environmental measure and the dynamic environmental measure. In some embodiments, the personal risk factor is a weighted sum of a plurality of elements including a number of years the participant has been employed by the enterprise and the position of the participant in the enterprise. In some embodiments, the static environmental factor comprises a location of the participant from which the participant is accessing the meeting.

In some embodiments, the dynamic environmental factor is automatically learned without user input to assess participant behavior during the meeting. The risk level of the participant can be updated during the meeting based on the automatic learning of the dynamic environmental factor. In some embodiments, the automatic learning of the dynamic environment factor comprises integrating an organization chart of the enterprise or using at least one biometric signal to identify an uninvited person at the meeting and determining a level of security associated with the uninvited person. In some embodiments, the automatic learning of the dynamic environment factor comprises automatically detecting the participant accessing the meeting from an unregistered location and determining a level of security associated with the unregistered location. In some embodiments, the automatic learning of the dynamic environment factor comprises automatically detecting an unregistered recording device connected to the meeting location and determining a level of security associated with the unregistered recording device. In some embodiments, the automatic learning of the dynamic environment factor comprises using speech recognition to analyze a conversation during the meeting, identifying one or more keywords in the conversation, and determining a level of security associated with the conversation based on the one or more keywords detected.

In some embodiments, the static environmental factor or the dynamic environmental factor is automatically detected using at least one of an electronic detection device. The electronic detection device can comprise one of a sensor, a microphone, a biometric scanner, a camera, or a personal wearable device.

In some embodiments, filtering the content of the meeting for the participant comprises removing at least one section of the one or more sections of the meeting content that has a risk definition exceeding the risk level of the participant. In some embodiments, the one or more risk definitions corresponding to the one or more sections of the meeting content are automatically determined. The risk definitions are used to measure a level of confidentiality of each of the one or more content sections.

In some embodiments, the meeting is recorded if the risk level of the participant is above a predetermined threshold.

In some embodiments, the system of the present invention further comprises a risk definition agent, in electrical communication with the risk assessment agent, configured to supply the one or more risk definitions to the risk assessment agent. In some embodiments, the system of the present invention further comprises a risk assessment engine, in electrical communication with the risk assessment agent, configured to supply one or more risk-based assessment rules to the risk assessment agent for determining the risk level for the participant by the risk assessment agent.

In some embodiments, the risk assessment agent is installed on a client computing device of the participant. In some embodiments, at least one electronic monitoring device is connected to the client computing device of the participant. The at least one electronic monitoring device, in electrical communication with the risk assessment agent, is configured to collect at least one of the static or dynamic environmental factor related to the participant. In some embodiments, the at least one electronic monitoring device comprises one of a sensor, a microphone, a biometric scanner, a camera, or a personal wearable device.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
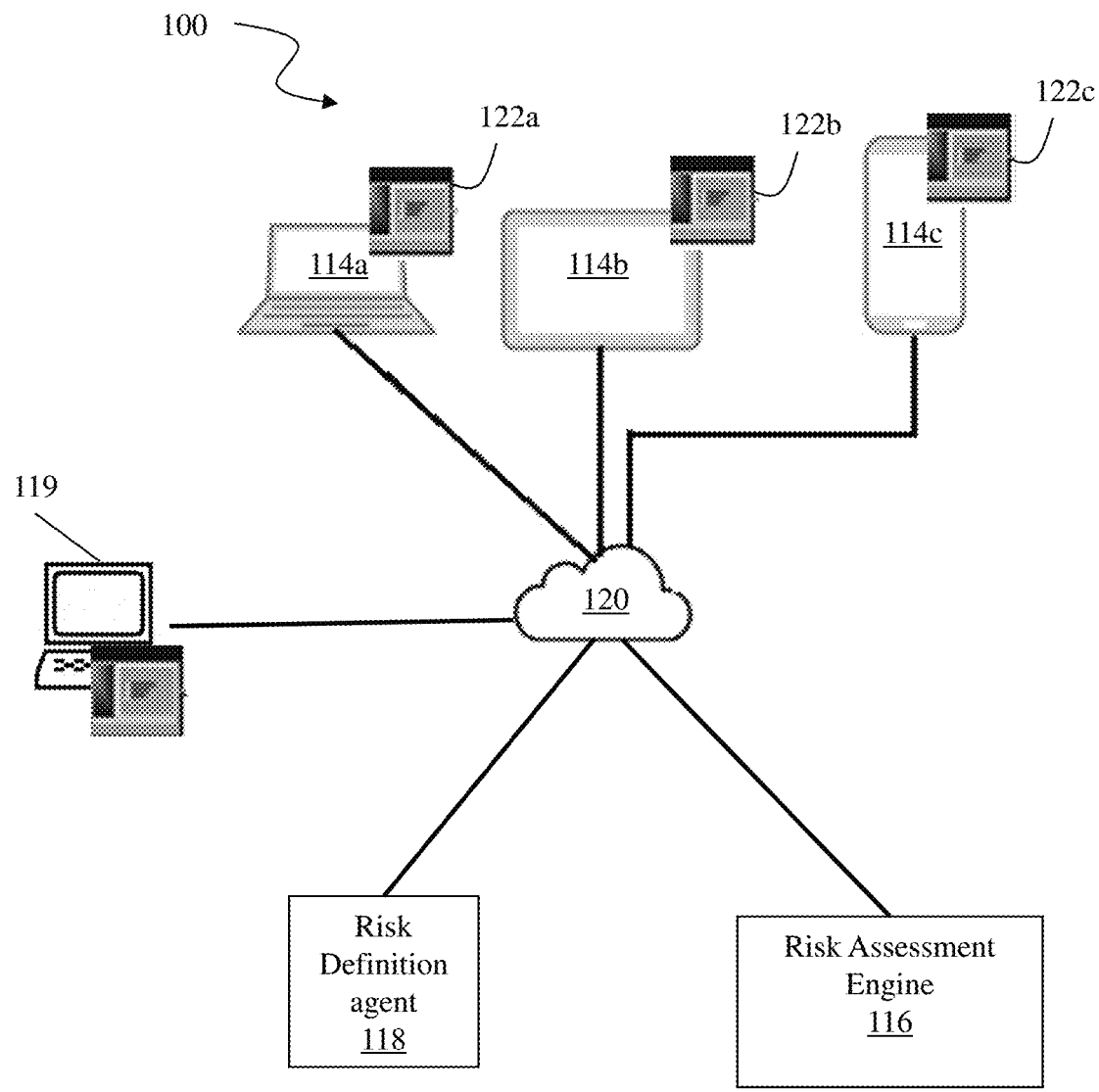
FIG. 1 is a block diagram of a network environment for enabling electronic distribution of meeting content, according to an illustrative embodiment of the invention.

FIG. 1 is a block diagram of a network environment 100 for enabling electronic distribution of meeting content to one or more participants, according to an illustrative embodiment of the invention. As shown, the network environment 100 includes one or more user computing devices 114 (e.g., 114a-c), a risk assessment engine 116, a risk definition agent 118 and a broadcasting device 119. A meeting participant, via a risk assessment agent 122 installed on his user computing device 114, can connect to the broadcasting device 119 to attempt to access meeting content on the user computing device 114. The risk assessment definition agent 118 and the risk assessment engine 116 can provide rules and definitions to the risk assessment agent 122 for filtering the meeting content received from the broadcasting device 119. In some embodiments, each risk assessment agent 122, the broadcasting device 119, the risk assessment engine 116 and the risk definition agent 118 communicate with one another over an IP network 120.

Generally, the risk definition agent 118 is configured to generate and maintain a set of risk definitions for classifying different sections of the content of a meeting. The risk assessment engine 116 is configured to generate and maintain a set of one or more risk-based assessment rules for assessing the behavior or environment conditions of a meeting participant. The risk assessment engine 116 can employ a self-learning algorithm to automatically evolve and fine tune the assessment rules based on historical participant interactions and behavior. The broadcasting device 119 is configured to broadcast the content of a meeting. Each of the risk assessment agents 122 (e.g., 122a-c), installed on each user computing device 114, is configured to receive the meeting content from the broadcasting device 119, the meeting content-related risk definitions from the risk definition agent 118 and the participant assessment rules from the risk assessment engine 116. In some embodiments, one or more of the user computing devices 114 are connected to and in electrical communication with at least one electronic monitoring device to assess environmental conditions related to the corresponding participants for the purpose of determining whether the risk assessment rules are satisfied. Based on the received information, the risk assessment agent 122 can determine which section(s) of the meeting content should be provided to the corresponding participant of the user computing device 114. For example, depending on the sensitivity of the meeting content and a risk level assigned to the participant (e.g., calculated based on a combination of the dynamic and static environmental evaluations and personal risks associated with the participant), different sections of the meeting content can be provided to different participants via their corresponding user computing devices 114. Specifically, meeting content sections that are deemed more sensitive than the calculated risk level is withheld from the remote participant. The risk assessment agent 122 can perform such on-going assessment throughout the meeting such that meeting content of different granularity can be displayed to the same participant at different points in time.

Each of the user computing devices 114 can be a computing device with a processor and memory that can execute instructions. In addition, each user computing device 114 can be a device with internet connectivity that may send or receive data from the internet. Further, each user computing device 114 can provide a graphical user interface (GUI) to view filtered/personalized meeting content, as described herein. Exemplary user computing devices 114 include but are not limited to laptop computers, desktop computers, tablets and smartphones. It should be appreciated that other types of computing devices that are capable of connecting to the components of the system 100 can be used without departing from the scope of invention.

Each of the risk assessment engine 116, the risk definition agent 118 and the broadcasting device 119 is a combination of (i) hardware, including one or more processors and one or more physical memory modules, and (ii) specialized software engines that execute on a processor to receive data from other components of the system 100, transmit data to other components of the system 100, and perform functions for personalized meeting content presentation as described herein. In some embodiments, the modules 116, 118 and 119 are specialized sets of computer software instructions programmed onto a dedicated processor and can include specifically-designated memory locations and/or registers for executing the specialized computer software instructions. The modules 116, 118 and 119 can be executed on the same processor or different processors. In some embodiments, each risk assessment agent 122 is in the form of a computer software application. Even though FIG. 1 illustrates that the risk assessment agent 122 is installed on each of the user computing device 114, in other embodiments, at least a portion of the risk assessment agent 122 is installed on the risk assessment engine 116, the risk definition agent 118 and/or the broadcasting device 119.

Generally, the IP network 120 enables components of the system 100 to communicate with each other to perform the process of data masking as described herein. The IP network 120 may be a local network, such as a LAN, or a wide area network, such as the Internet and/or a cellular network. In some embodiments, the IP network 120 is comprised of several discrete networks and/or sub-networks (e.g., cellular to Internet) that enable the components of the system 100 to communicate with each other. Each of the user computing devices 114 can access the IP network 120 via an intermediate agent (not shown), such as a firewall, a wireless access point, or a wired access point.

Figure 2:
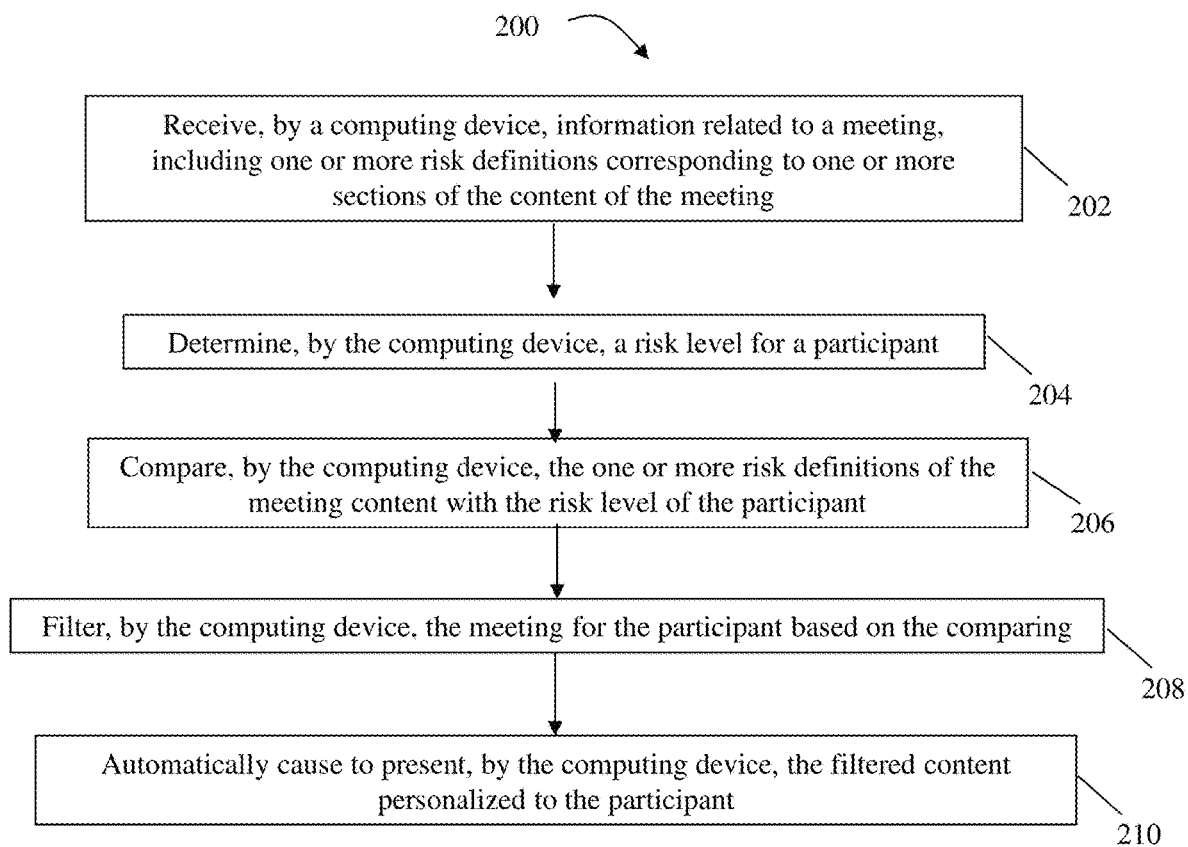
FIG. 2 is an illustrative process executed by a risk assessment agent of FIG. 1 to automatically determine which section(s) of a meeting content is provided to a participant, according to an illustrative embodiment of the invention.

FIG. 2 is an illustrative process 200 executed by a risk assessment agent 122 of FIG. 1 to automatically determine which section(s) of a meeting content is provided to a participant via the participant's user computing device 114, according to an illustrative embodiment of the invention. Generally, the risk assessment agent 122 classifies and filters meeting content for provision to a participant based on the risk of the content being seen inappropriately.

The process 200 is initiated upon the risk assessment agent 122 receiving a request from a participant via a user computing device 114 to remotely access a meeting and its associated content. The content can be for example, documents (e.g., presentations and handouts) being shared online at the meeting and/or voice data (e.g., conversations) generated during the meeting. The risk assessment agent 122, upon detecting the request, is configured to interact with the risk definition agent 118 to obtain a set of risk definitions for classifying the meeting content (step 202). The set of risk definitions is configured to indicate the potential for nefarious or inappropriate use of information if the information becomes known to unintended parties. Based on the risk definitions, the risk assessment agent 122 can classify, in real time or near real time, different segments of the content being shared during the meeting into one of several confidentiality types, such as "general" content, "confidential" content, or "highly confidential" content. As an example, this range of risk definitions can be applied to elements of an employee's human resource record shared during a meeting. In this situation, meeting content related to the employee's name, position in the company and desk phone number can be classified as a "general" risk if exposed, meeting information related to corporate identification and home address can be classified as a "confidential" risk if exposed, and meeting content related to salary and date of birth can be classified as a "highly confidential" risk if exposed.

The risk assessment agent 122 can receive live streaming of the meeting content from the broadcasting device 119. In some embodiments, the risk assessment agent 122 classifies the received meeting content in real time or in near real time as the meeting progresses using the risk definitions for the data elements in the meeting content, which can be obtained from the risk definition agent 118 prior to the commencement of the meeting. In some embodiments, the broadcasting device 119 interacts with the risk definition agent 118 to classify the meeting content prior to providing the classified content to the risk assessment agent 122 installed on the requesting user device 114. Each data element in the meeting content can be either new (i.e., no existing risk definition is applicable) or classified according to at least one existing risk definition using, for example, system templates that enable risk classification of multiple content elements assigned in bulk.

In some embodiments, the risk definition agent 118 of the system 100 is configured to automatically learn one or more risk definitions (without user input) that are employed by the risk assessment agent 122 to assess the confidentiality of different sections of meeting content. Specifically, the risk definition agent 118 can automatically suggest a risk level threshold associated with a meeting content segment that a participant needs to satisfy in order to access the segment.

The risk assessment agent 122 is also configured to determine a risk level associate with the participant of the user computing device 114 from which the access request is made. This risk level can be evaluated periodically or continuous during the meeting to dynamically track the risk of exposing meeting content to the participant. The risk assessment agent 122 calculates the risk level of a participant at a specific point in time during the meeting based on a variety of considerations including geographical location of the participant, physical location of the participant (e.g., on-site, within specific area/room on-site, at desk etc.), security rating of the network from which the participant is accessing the meeting (public, home private etc.), local environmental risks (e.g. internet café versus vendor site), authentication methods (e.g., password versus multifactor authentication, including biometric sensing), and/or risk of unwanted observations (e.g., using device camera for motion detection and/or using Amazon Echo or microphone to detect other presences in the meeting room, etc.). These considerations can be captured by a combination of three factors, including a personal risk factor, a static environmental risk factor, and a dynamic environmental risk factor. The calculations of these three factors explained below are illustrative only, with the understanding by a person of ordinary skill in the art that the complexity of each factor can increase or decrease for specific situations.

Generally, the personal risk factor is a measure of trust in the meeting participant based on, for example, his experience and standing within the organization associated with the meeting. In some embodiments, the personal risk factor is a sum or weight sum of one or more elements including the participant's level/position in the organization (employee level score), the number of years the participant has been employed by the organization (company tenure score) and the amount of time the participant has been staffed on a project associated with and being discussed at the meeting (project tenure score). In an exemplary calculation, each of these elements is assigned a score on a point scale of 0.0 to 1.0. An average of these scores is taken to determine a calculated measure of trust in the participant, which can then be subtracted from 1 to calculate the associated personal risk factor. In some embodiments, the rules defining the personal risk factor, including rules for setting the employee level score, the company tenure score, and the project tenure score, are obtained by the risk assessment agent 122 from the risk assessment engine 116.

For example, a junior associate who has been with the organization for 18 months and has been on the project for the entire project duration of 12 months can be assigned an employee level score of 0.1, a company tenure score of 0.4 and a project tenure score of 1.0, which yields an average of 0.5. The personal risk factor for this junior associate is then 0.5 (1−0.5). In contrast, a midlevel manager who has been with the organization for 5 months and has been on the project for 2 months can be assigned an employee level score of 0.5, a company tenure score of 0.2 and a project tenure score of 0.2, which yields an average of 0.3. The personal risk factor for this midlevel manager is then 0.7 (1−0.3). This means that the midlevel manager with shorter time on the project poses a higher personal risk than the more-tenured, but lower-ranked junior associate in this case.

In some embodiments, an override can be assigned to a particular element or to a particular type of participant such that satisfaction of this element or participant type allows the participant to have minimal personal risk even though the calculated personal risk associated with the participant may be high. This override option can be used by the system 100 to address exceptional circumstances to ensure appropriate exceptions/edge cases are accounted for. For example, if a participant is a senior leader who has been with the company for 15 years, but is just assigned to lead the project, the participant's employee level score is 1.0, company tenure score is 1and project tenure score is 0.1, which yields an average of 0.7. The personal risk factor for this senior leader is then 0.3 (1−0.7). However, because the senior leader is the head of the project, he is allowed to see all the meeting content regardless of his personal risk level. Therefore, an override can be authorized such that his personal risk factor is adjusted to 0.

Generally, the static environmental risk factor is a measure of trust associated with one or more static environmental features that are adapted to remain unchanged throughout the meeting. An exemplary static environmental feature is the location from which the participant is remotely accessing the meeting content. This factor is considered static because the location is unlikely to change throughout the meeting. In some embodiments, the static environmental risk factor is a sum or weight sum of one or more elements, including the trustworthiness of the network used by the participant to connect to the meeting (trusted network connection score), the degree to which the participant location prevents visual observation (visual observation prevention score), and the degree to which the participant location prevents audio eavesdropping (audio eavesdropping prevention score). In an exemplary calculation, each of these elements is assigned a score on a point scale of 0.0 to 1.0. An average of these scores is taken to determine a calculated measure of trust in the participant location, which can then be subtracted from 1 to calculate the associated static environmental risk factor. In some embodiments, the rules defining the static environmental risk factor, including rules for setting the trusted network connection score, the visual observation prevention score, and the audio eavesdropping prevention score, are obtained by the risk assessment agent 122 from the risk assessment engine 116.

As an example, remotely accessing a meeting from the on-site office of a senior leader, which is on a $2^{nd}$ floor building with opaque glass walls leading to an open plan office, can be assigned a trusted network connection score of 1.0, a visual observation prevention score of 0.9, and an audio eavesdropping prevention score of 0.5, which yields an average of 0.8. In general, an office with opaque glass wall is less likely to facilitate visual observation by a third party than a room with clear glass wall, thus is assigned a higher observation prevention score than a room with clear glass wall. The static environmental risk factor for this location is then 0.2 (1−0.8). In another example, remotely accessing the same meeting from an on-site video-conference room, which is on an open plan area with clear glass walls leading to a corridor, can be assigned a trusted network connection score of 1.0, a visual observation prevention score of 0.4, and an audio eavesdropping prevention score of 0.4, which yields an average of 0.6. The static environmental risk factor for this location is then 0.4 (1−0.6). In another example, remotely accessing the same meeting from a private off-site location (e.g., the participant's home) can be assigned a trusted network connection score of 0.4, a visual observation prevention score of 0.2, and an audio eavesdropping prevention score of 0.3, which yields an average of 0.3. The static environmental risk factor for this location is then 0.7 (1−0.3). In yet another example, remotely accessing the same meeting from a public off-site location (e.g., the participant dialing in from a public WIFI network at an airport) can be assigned a trusted network connection score of 0, a visual observation prevention score of 0, and an audio eavesdropping prevention score of 0, which yields an average of 0. The static environmental risk factor for this location is then 1 (1−0.0). These examples show that the on-site office of a senior leader is determined to be far less risky than a remote public location. In some embodiments, an override can be assigned to a particular element or to a particular type of participant such that satisfaction of this element or participant type allows the participant to have minimal static environmental risk even though the calculated risk associated with the participant may be high. For example, if a participant is a senior leader, even if he is accessing the meeting from a public offsite location, an override can be authorized such that his static environmental risk factor is adjusted to 0.

Generally, the dynamic environmental risk factor is a measure of trust associated with one or more dynamic environmental features that are adapted to change during the meeting. Exemplary dynamic environmental features include unidentified attendees, suspected eavesdropping activities and meeting content change. In some embodiments, these dynamic environmental features can be automatically detected using one or more electronic detection devices in electrical communication with the risk assessment agent 122, such as one or more sensors, microphones, biometric scanners, cameras, and personal wearable devices installed on the computing device 114, worn by the participant, or installed at the location from which the meeting content is accessed. An exemplary electronic detection device can be an Amazon Echo used when there is one or more people in the remote meeting room, a biometric sensor with finger print and/or speaker recognition, a conventional and/or thermal camera with facial recognition capabilities to determine the identity and number of people in the remote meeting room, a room sensor, a general network location (e.g., private or public), or a personal device (e.g., a mobile phone, a smart watch or a Fitbit).

In some embodiments, the dynamic environmental risk factor is a sum or weight sum of one or more elements, including the trustworthiness of the dynamic environmental features (trust score) and verification of the trustworthiness of the dynamic environmental features by the electronic detection devices (electronic surveillance score). In an exemplary calculation, each of the trust score and the electronic surveillance score is assigned a value on a point scale of −1.0 to 1.0. An average of these scores is taken to determine a calculated measure of trust in the unexpected/dynamic occurrence(s), which can then be subtracted from 1 to calculate the associated dynamic environmental risk factor. In some embodiments, the electronic surveillance score is optional and is used to augment the trust score. Alternatively, the electronic surveillance score is a necessary input. In some embodiments, the rules defining the dynamic environmental risk factor, including rules for setting the trust score and the electronic surveillance score, are obtained by the risk assessment agent 122 from the risk assessment engine 116.

As an example, if an uninvited person is detected in a room where the meeting content is being provided, accompanied by an invited and validated person, but the additional person is subsequently identified during the meeting as the personal assistant for a senior leader, the trust score is set to the same value as that of the senior leader who vouches for the uninvited person (i.e., 1.0). In addition, if the identification of this location is further confirmed by the usage of one or more electronic detection devices (e.g., a facial recognition program), where the usage of each electronic detection device can be assigned a certain score (e.g., 0.2) the electronic surveillance score in this case can be set to 0.4 to reflect the usage of two electronic detection devices (e.g., an Amazon echo and a fish eye camera). Thus, the average score for this dynamic scenario is 0.7 ((1+0.4)/2) and the dynamic environmental risk factor in this scenario is 0.3 (1−0.7). As another example, if an uninvited person is detected in or adjacent to a room where the meeting content is being provided and the person remains unidentified throughout the meeting, the trust score is set to −1.0. The electronic surveillance score remains 0.4 in this case due to the usage of two electronic detection devices. Thus, the average score for this scenario is −0.3 ((−1+0.4)/2) and the dynamic environmental risk factor in this scenario is 1.3 (1−−0.3). As another example, if a participant is remotely dialing into the meeting from an unplanned location, but the unplanned location is registered with and recognized by the system 100, the trust score can be set to 0.8. Similarly, the electronic surveillance score remains 0.4 in this case due to the usage of two electronic detection devices. Thus, the average score for this scenario is 0.6 ((0.8+0.4)/2) and the dynamic environmental risk factor in this scenario is 0.4 (1−0.6). As another example, if a participant is remotely dialing into the meeting from an unplanned location that is not registered with the system 100, the trust score can be set to 0.0. In this example, the electronic surveillance score is set to 0.2 to reflect that only one electron surveillance device (e.g., a fish eye camera only) is detected in the new unregistered location. Thus, the average score for this scenario is 0.1 ((0.0+0.2)/2) and the dynamic environmental risk factor in this scenario is 0.9 (1−0.1).

These examples show that the event with the lowest dynamic environment risk factor (i.e., an identified associate in the meeting room who has been vouched for by a senior leader) still has an element of risk involved, which is reflected by the dynamic environment risk factor of 0.4. This may mean that certain sensitive meeting content is withheld from that location, as described in detail below. However, the 'vouched for' attendee is generally assigned a trust value higher than that of a true 'unidentified' person, and the corresponding risk is decreased. Further, an unidentified person does not need be in the meeting room to be classified as unidentified. A person detected adjacent to the meeting room, such as in the corridor outside of a window of the meeting room or by a camera in the common area of a work place, can also be classified as unidentified, thus heightening the risk of exposure of sensitive meeting content. The dynamic environment risk factor can be periodically assessed such that it is suitably adjusted based on the changing nature of the unexpected occurrences (e.g., if the unidentified person moves away from the zone of detection). In some embodiments, an override can be assigned to a particular scenario such that satisfaction of the override condition can allow a participant to have minimal dynamic environmental risk even though the calculated dynamic risk associated with the participant may be high. Overriding can be based on standard or custom rules for specific scenarios. For example, if a very senior executive needs to see certain information, but is at a high risk rated location (e.g. public internet booth in an airport due to technical issues with his own equipment), an override rule with speed bump warning can be implemented to allow the senior executive to access the requested information.

In other examples, if a meeting is being attending in a conference room by two associates, and during the meeting a third person is detected entering the conference room, the meeting content provided to that location may be withheld until the third person is identified and assessed. Facial recognition software and inputs from other biometric and non-biometric sensors can be incorporated to confirm the identity of the additional person. In the event an associate attends a meeting from an unexpected/unscheduled location, meeting content may be withheld until an explanation is provided (e.g. associate unexpectedly working remotely) and further risk assessment on the new location is completed. Additionally, in such scenarios, extra technology-based input devices can be used to assess the level of trust in the change. For example, an Amazon Echo or another audio-based virtual assistant can be used to detect the number of voices present, thereby determining if additional parties are in the room. Similarly, fish-eye and/or thermal cameras can be used to provide visual input and biometric inputs can be used to provide further validation of those present. In some embodiments, the decision to display or withhold specific information for each meeting location is not just vertical throughout the organization. For example a Vice President in Department A may see all of the information relevant to that department, but only high level information for Department B, and vice versa for a Vice President in Department B. Associates on Team X in Department A may see pertinent information for their team only, whereas associates on Team Y at a similar level in the organization will only see the information relevant to their team.

In some embodiments, the risk assessment engine 116 of the system 100 is configured to automatically learn and evolve the rule set for computing the dynamic environmental factor without user input. In some embodiments, at the initiation of a meeting, the risk assessment rules are verified by a human, such as by a meeting organizer, as being valid for identifying dynamic risks. Thus, existing risk assessment rules can be initially enforced. As the meeting progresses, the risk assessment engine 116 learns from these initial validations and is adapted to automatically determine, without human input, if new information received throughout the meeting qualifies as high, medium or low risks and can adjust the assessment rules accordingly. Thus, while initially based on input rules, the risk assessment engine 116 can evolve the rule set to automatically account for appropriate activities. For example, company resources (e.g. organization chart) can be queried to determine reporting line, access privileges etc. Rules regarding access decision can be automatically made or suggested based on the queries, and a meeting organizer can be notified for sign-off (live or after the fact) and audit purposes. Future decision or recommendations can be made based on previous patterns. In some embodiments, various enterprise surveillance devices are used to cross-reference and validate these automatically-determined rules, thereby increasing the level of confidence associated with the rules. Generally, the more information that is gathered using additional surveillance devices, the higher level of confidence that can be place in the automatic learning decisions. For example, a single camera on a participants laptop may give some level of confidence on the number of participants in that room, but a room with multiple cameras, motion detectors, and/or biometric sensors provide a more detailed assessment of who is in the room (persons known or unidentified). As a result, the rule set for determining a dynamic environmental factor of a location can be automatically updated by the risk assessment engine 116 based on the automatic learning.

As an example, the automatic learning process can involve the risk assessment engine 116 automatically detecting a participant accessing the meeting from an unregistered location, automatically determining the security vulnerabilities of the unregistered location, and automatically updating the pertinent rules for calculating the dynamic environmental factor in this situation. For example, for a meeting attendee connecting from a remote location, the risk definition agent 118 can cross-reference the detected location against the attendee's address stored in the Human Resource/Payroll systems for the purpose of better assessing the risk factor relating to the detected location. The location of the attendee's company mobile device can also be used to further validate the detected location. The risk assessment engine 116 can flag this location as an unsafe location as a part of the risk assessment rules if the location cannot be verified. As another example, the risk assessment engine 116 can determine that a location of a participant is a safe location, even if the location is not listed as a registered meeting room, but is the home office of a senior leader. The risk assessment engine 116 can make such a determination using a combination of electronic detection mechanisms including, for example, detection of the Virtual Private Network (VPN) address associated with the unregistered location, the GPS coordinate from a trusted mobile device of the participant and the registered home address of the senior leader from the company's human resource records. Thus the use of the electronic surveillance devices in this case can confirm with a high degree of confidence that the participant is at a trusted location. The risk assessment engine 116 can then include this location in a safe location registry as a part of the risk assessment rules.

As another example, the automatic learning process of the risk assessment engine 116 can involve automatically integrating an enterprise organization chart and/or using at least one biometric signal measured from a remote meeting room to identify an uninvited person at the meeting, automatically determining the risk level of the unexpected attendant, and automatically updating the pertinent rules for calculating the dynamic environmental factor in this situation. The biometrical signal can be generated from at least one of facial recognition, voice-print analysis, gait analysis or another biometric characteristic that is passively collected during the meeting. Active biometric detection such as finger print or retina scanning can also be used as inputs. In addition to using one or more biometric characteristics to supplement the automatically-generated rules, the risk assessment engine 116 can also supplement the rules using one or more location-based detection methods. For example, the system 100 can scan the remote network to determine if there are additional sensors already attached (e.g., an audio virtual assistant). Any additional sensors that are detected can be activated by the risk assessment engine 116 to monitor the participant's behavior during a meeting to supplement the rules for calculating the dynamic environmental factor. On subsequent connections from that location, if one or more of the sensors become disconnected, the risk assessment engine 116 can prompt the participant to reconnect or reassess the dynamic environmental factor.

In some embodiments, the risk assessment engine 116 can automatically detect possible inappropriate behavior at a remote meeting location utilizing, for example, a video camera feed and/or other connected electronic devices. Exemplary inappropriate behavior detected include more than the invited number of attendees being present during the meeting, an unrecognized recording device being used at a remote location where the meeting content is streamed, or a party taking screen grabs of the meeting content and saving them elsewhere. A radio-frequency receiver can also be used to detect certain unauthorized electronic broadcasting devices installed in the meeting room to determine if their usage is in breach of a "no device in meeting room" rule. Further, inappropriate behavior can be identified through observations of other attendees of the meeting. This suspicion can be flagged to the system and an override of the risk measure can be enforced, based on which the system 100 can reduce the level of detail shared with that location. In the event that possible inappropriate behavior is suspected or when the overall risk level of a participant is higher than a certain predetermined threshold, the risk assessment engine 116 can initiate video or audio recording of the attendees at the remote location by interacting with the electronic devices connected to that location. In some embodiments, the risk assessment engine 116 uses speech recognition to analyze a conversation during the meeting. For example, the risk assessment engine 116 can identify one or more keywords/phrases in the conversation; and if one or more criteria is met (e.g., recognition of 5 keywords in 1 minute), the risk assessment engine 116 can adjust the assessment rules to increase the dynamic environmental risk factor for the meeting and initiate security protocols, such as block content streaming to non-secure endpoints. In some embodiments, voice analysis technology can allow a meeting attendee (with sufficient authority) to initiate an override of the calculated risk for a particular location for the purpose of excluding members of the meeting at that location. For example, a key phrase can be referenced by the meeting attendee to enact this override feature. Alternative, if a certain phrase representative of a topic is mentioned (e.g. Project X), this override can be enacted for a short period of time to allow conversation involving the topic to complete.

In some embodiments, the overall risk level of each participant is a sum or weighted sum of the personal risk factor, the static environmental risk factor and the dynamic environmental risk factor. As an example, for a mid-level manager (assigned a personal risk factor of 0.7) accessing a meeting from a common video-conference room (assigned a static environmental risk factor of 0.4), which is a location registered with and recognized by the system 100, but not scheduled for the meeting (assigned a dynamic environmental risk factor of 0.4), the overall risk level for this meeting participant is 0.5 ((0.7+0.4+0.4)/3). However, different weights can be assigned to different factors to prioritize their importance in the overall risk level calculation. For example, the personal risk factor can be assigned a weight of 0.5, the static environmental risk factor can be assigned a weight of 0.3 and the dynamic environmental risk factor can be assigned a weight of 0.2. Thus, the resulting risk level for this meeting participant becomes 0.55. In alternative embodiments, instead of the overall risk level being an average or weighted average of the three factors, it is the highest of the three factors. Thus, the highest assess risk determines the resulting meeting content provided to the participant.

With continued reference to FIG. 2, after a risk assessment agent 122 classifies, in real time or near real time, the content being shared during the meeting into one of several categories, such as general content, confidential content, or highly confidential content (step 202) and determines a risk level associated with a participant requesting the meeting content via his computing device 114 (step 204), the risk assessment agent 122 is adapted to compare the classification of a meeting content section with the risk level of the participant to determine whether the meeting content section should be shared with or withheld from the participant (step 206). Thus, a participant is only permitted to access the meeting content that is suitable to his risk level at the time of the comparing. In some embodiments, each meeting content segment is associated with a classification type, which is in turn associated with a risk level threshold, such that a participant is only allowed to access the meeting content segment if the participant's risk level satisfies or exceeds the risk level threshold. Table 1 below shows an exemplary chart correlating different meeting content with their classification type and risk level thresholds. Generally, the more sensitive and confidential the topic of a meeting content segment, the lower the risk threshold is required to be able to access the content segment.

TABLE 1

Correlations among different meeting content with their classification type and risk level thresholds.

| Meeting content segment topic | Classification | Required risk level threshold |
|---|---|---|
| Name | General | >0.5 |
| Corporation ID | General | >0.5 |
| Grade | General | >0.5 |
| Home address | Confidential | 0.25-0.5 |
| Salary | Highly confidential | <0.25 |

As shown, a participant with an overall risk level of less than 0.25 can access all the information presented at a meeting, a participant with an overall risk level of between 0.25 and 0.5 can access content that is confidential and general, but not highly confidential, and a participant with an overall risk level of greater than 0.5 is only able to access general content. Even though the example above uses three categories for classifying meeting content sensitivity, this granularity can be suitably adjusted to have fewer or more categories. In some embodiments, the risk levels associated with the individual data elements of the information being shared are calculated as a weighted sum, thereby changing the specific ratings of the data elements for different meeting access locations and/or attendee profile scenarios.

Based on such comparing, the risk assessment agent 122 is adapted to filter the meeting content accessible by a participant. Specifically, the risk assessment agent 122 can withhold certain meeting content section and allow presentation of only those sections that satisfy the thresholds described above (step 210). Therefore, for the same meeting, different meeting content can be provided on different computing devices 114.

Figure 3:
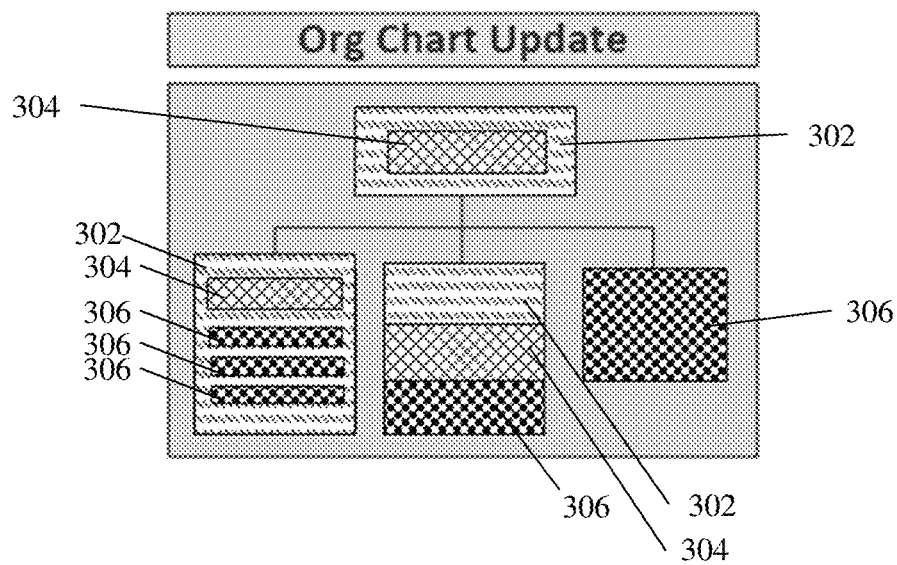
FIG. 3 is an exemplary presentation available for distribution in a meeting, where different sections of the presentation have different associated risk levels, according to an illustrative embodiment of the invention.
Figure 4A:
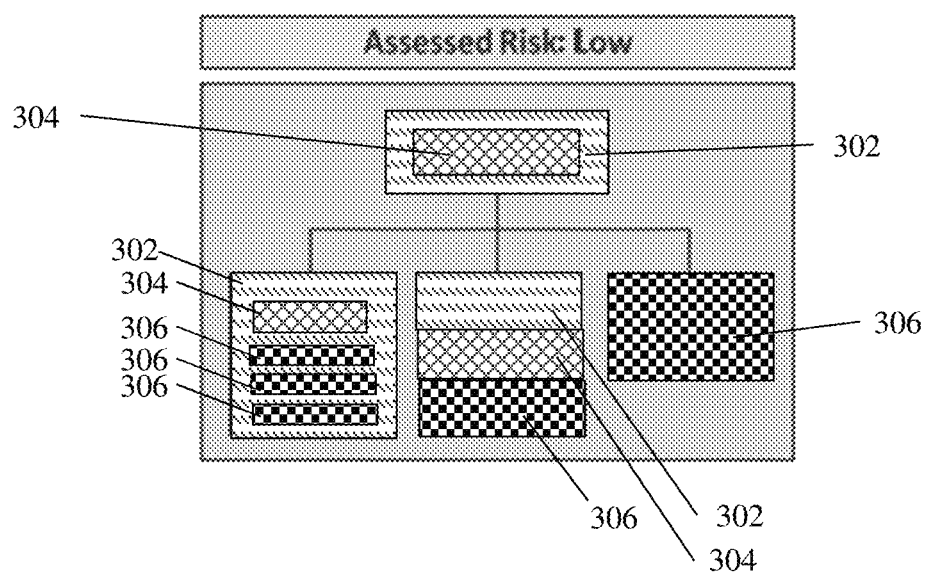
FIGS. 4a-c are exemplary personalized presentations displayed to different participants with content filtered based on the risk levels associated with the participants, according to an illustrative embodiment of the invention.
Figure 4B:
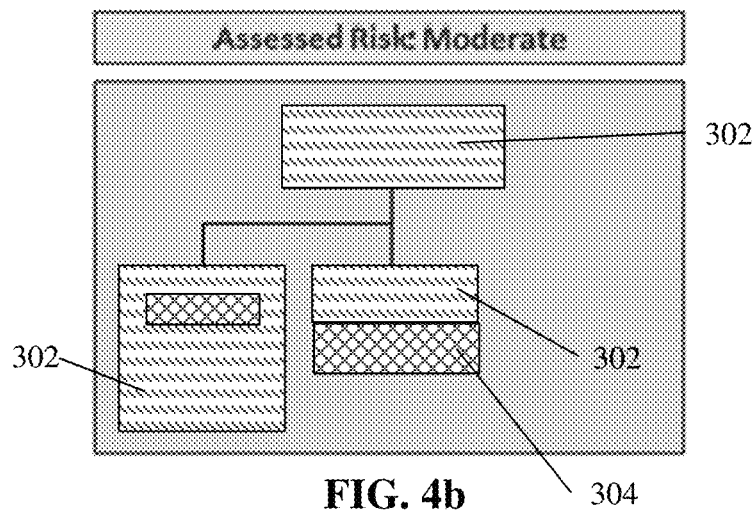
Figure 4C:
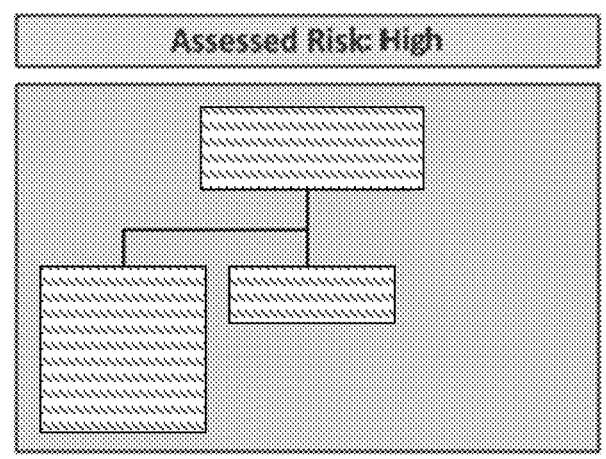

FIG. 3 is an exemplary presentation 300 available for distribution in a meeting, where different sections of the presentation have different associated risk levels, according to an illustrative embodiment of the invention. Specifically, the presentation 300 includes content sections with highly confidential data 306 having high assessed risks, content sections with confidential data 304 with moderate assessed risks, and content sections with general data 302 with low assessed risks. FIGS. 4a-c are exemplary personalized presentations displayed to different participants with content filtered based on the risk levels associated with the participants, according to an illustrative embodiment of the invention. FIG. 4a shows an exemplary presentation personalized to a participant who has been evaluated to have a low risk level at the time of the data display. Therefore, this participant is able to view all content segments 302, 304, 306 of the original presentation 300 of FIG. 3. FIG. 4b shows an exemplary presentation personalized to a participant who has been evaluated to have a moderate risk level at the time of the data display. Therefore, this participant is able to view the general and confidential content sections 302, 304 of the original presentation 300 with low and moderate risk levels, but is unable to view the highly confidential content sections 306. FIG. 4c shows an exemplary presentation personalized to a participant who has been evaluated to have a high risk level at the time of the data display. Therefore, this participant is able to view only the general content sections 302 of the original presentation 300 corresponding to a low risk level, but is unable to view the highly confidential and confidential content sections 306, 304.

Additional functionalities can be implemented by the system 100 to further control the presentation of meeting content to a particular participant. In some embodiments, the system 100 allows a participant to black out the screen of his own computing device 114 if he believes that he is exposing meeting data inappropriately. This functionality can also be triggered remotely by a meeting organizer or automatically by the system 100 if a suspicious activity is suspected at a remote meeting location. In some embodiments, a meeting organizer is capable of overriding all or a portion of the assessed risks for the meeting content or the participants such that, for example, only the highest clearance level participants can see meeting content at some point during the meeting. In some embodiments, if a team member is out of the office and designated a delegate to attend the meeting on his behalf, a cross-reference check by the system 100 on the delegate is completed and a temporary risk profile can be calculated and assigned to the delegate. In the event that the delegate attends the meeting, the system 100 can send a notification to both parties confirming this attendance to ensure transparency. Further, in the event that an associate who is not a part of a listed project team becomes a regular attendee at meetings, the system 100 can automatically add the person to the project team or prompt the person to be added to the team and create a temporary risk profile to allow the person to see certain portions of the meeting content.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer-implemented method for electronically distributing content in a meeting to a meeting participant of an enterprise, the method comprising:
   receiving, by a computing device, information related to the meeting, including one or more risk definitions corresponding to one or more sections of content of the meeting;
   determining, by the computing device, a risk level for the meeting participant, wherein the risk level of the meeting participant comprises (i) a personal risk factor of the meeting participant based on a position of the meeting participant in the enterprise, (ii) a static environmental measure indicating a level of security associated with a static environmental factor that remains unchanged throughout the meeting, and (iii) a dynamic environmental measure indicating a level of security associated with a dynamic environmental factor that changes during the meeting,
   wherein the personal risk factor is a weighted sum of a plurality of elements comprising a number of years the meeting participant has been employed by the enterprise and the position of the meeting participant in the enterprise, and wherein the dynamic environmental measure includes a weighted sum of trustworthiness of the dynamic environmental factor and verification of the trustworthiness of the dynamic environmental factor by at least one electronic detection device;
   comparing, by the computing device, the one or more risk definitions of the meeting content with the risk level of the meeting participant;
   filtering, by the computing device, the content of the meeting for the meeting participant based on the comparing; and
   presenting, by the computing device, the filtered content of the meeting personalized to the meeting participant.

2. The method of claim 1, wherein the static environmental factor comprises a location of the meeting participant from which the meeting participant is accessing the meeting.

3. The method of claim 1, wherein the electronic detection device comprises one of a sensor, a microphone, a biometric scanner, a camera, or a personal wearable device.

4. The method of claim 1, wherein the risk level of the meeting participant is a weighted sum of the personal risk factor, the static environmental measure and the dynamic environmental measure.

5. The method of claim 1, wherein filtering the content of the meeting for the meeting participant comprises removing at least one section of the one or more sections of the meeting content that has a risk definition exceeding the risk level of the meeting participant.

6. The method of claim 1, further comprising automatically determining, by the computing device, the one or more risk definitions corresponding to the one or more sections of the meeting content, wherein the risk definitions are used to measure a level of confidentiality of each of the one or more sections.

7. The method of claim 1, further comprising recording, by the computing device, the meeting if the risk level of the meeting participant is above a predetermined threshold.

8. The method of claim 1, further comprising automatically learning, by the computing device, the dynamic environmental factor, without user input, to assess meeting participant behavior during the meeting.

9. The method of claim 8, further comprising updating the risk level of the meeting participant during the meeting based on the automatic learning of the dynamic environmental factor.

10. The method of claim 8, wherein the automatic learning comprises:
    integrating an organization chart of the enterprise or using at least one biometric signal to identify an uninvited person at the meeting; and
    determining a level of security associated with the uninvited person.

11. The method of claim 8, wherein the automatic learning comprises automatically detecting the meeting participant accessing the meeting from an unregistered location and determining a level of security associated with the unregistered location.

12. The method of claim 8, wherein the automatic learning comprises automatically detecting an unregistered recording device connected to the meeting location and determining a level of security associated with the unregistered recording device.

13. The method of claim 8, wherein the automatic learning comprises:
    using speech recognition to analyze a conversation during the meeting;
    identifying one or more keywords in the conversation; and
    determining a level of security associated with the conversation based on the one or more keywords detected.

14. A computer-implemented system for electronically distributing content in a meeting to a meeting participant of an enterprise, the system comprising:
    an electronic computer with a risk-assessment agent configured to:
    receive information related to the meeting, including one or more risk definitions corresponding to one or more sections of content of the meeting;
    determine a risk level for the meeting participant, wherein the risk level of the meeting participant comprises (i) a personal risk factor of the meeting participant based on a position of the meeting participant in the enterprise, (ii) a static environmental measure indicating a level of security associated with at least one static environmental factor that remains unchanged throughout the meeting, and (iii) a dynamic environmental measure indicating a level of security associated with at least one dynamic environmental factor that changes during the meeting,
    wherein the personal risk factor is a weighted sum of a plurality of elements comprising a number of years the meeting participant has been employed by the enterprise and the position of the meeting participant in the enterprise, and wherein the dynamic environmental measure includes a weighted sum of trustworthiness of the dynamic environmental factor and verification of the trustworthiness of the dynamic environmental factor by at least one electronic detection device;
    compare the risk level of the meeting participant to the one or more risk definitions corresponding to the one or more sections of the content of the meeting;
    filter the content of the meeting for the meeting participant based on the comparing; and present the filtered content of the meeting personalized to the meeting participant.

15. The computer-implemented system of claim 14, further comprising a risk definition agent, in electrical communication with the risk-assessment agent, configured to supply the one or more risk definitions to the risk-assessment agent.

16. The computer-implement system of claim 14, further comprising a risk assessment engine, in electrical communication with the risk assessment agent, configured to supply one or more risk-based assessment rules to the risk assessment agent for determining the risk level for the meeting participant by the risk assessment agent.

17. The computer-implement system of claim 14, wherein the risk assessment agent is installed on a client computing device of the meeting participant.

18. The computer-implement system of claim 14, wherein the at least one electronic detection device comprises one of a sensor, a microphone, a biometric scanner, a camera, or a personal wearable device.

* * * * *